June 23, 1953 G. M. EFFERSON 2,643,183
REACTOR HAVING NON-PLUGGING VALVE NOZZLE
Filed June 6, 1947 2 Sheets-Sheet 1
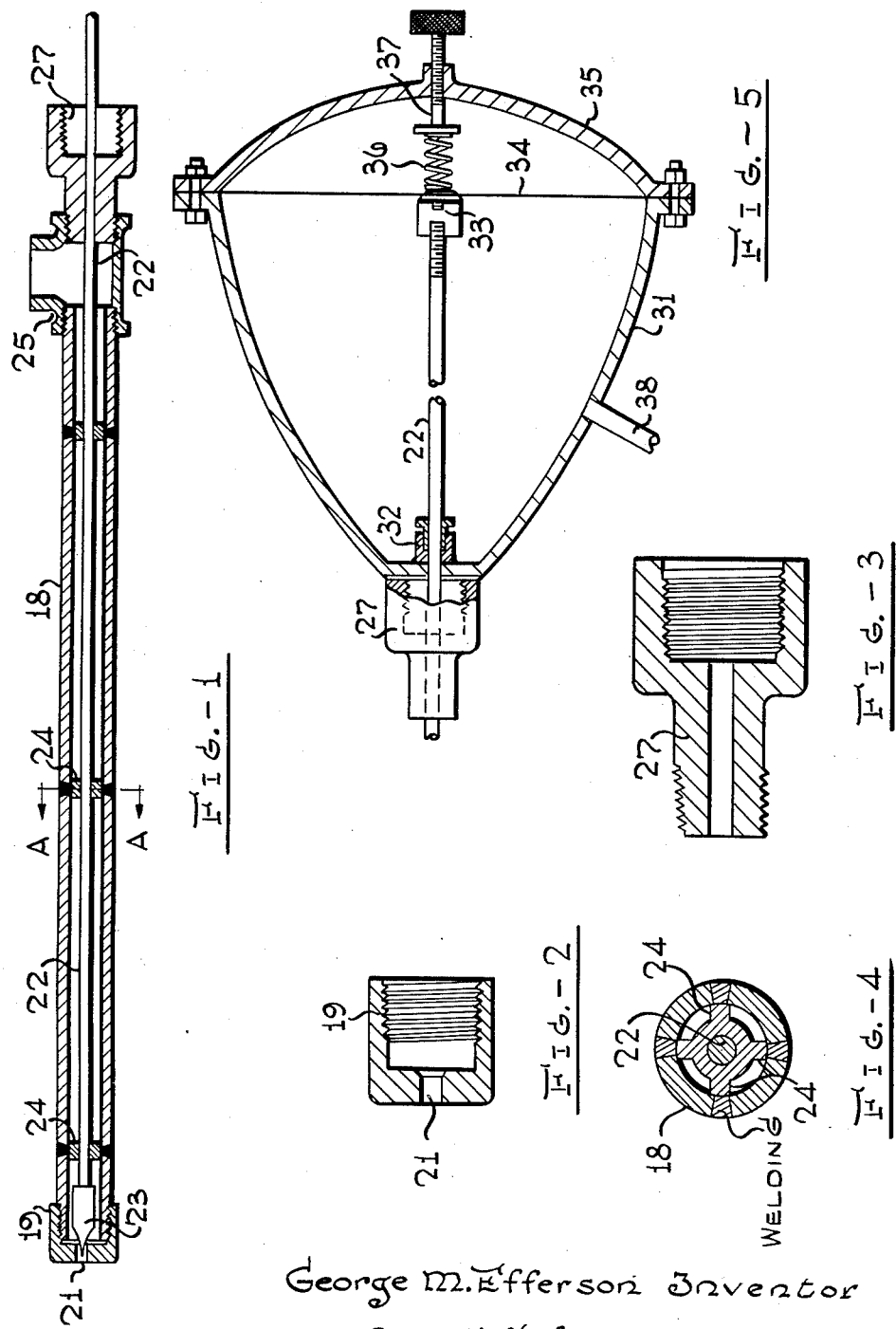
George M. Efferson Inventor
By W. H. Smyers Attorney George M. Efferson Inventor
By W. H. Smyers Attorney Patented June 23, 1953

2,643,183

UNITED STATES PATENT OFFICE 2,643,183

REACTOR HAVING NONPLUGGING VALVE NOZZLE

George M. Efferson, Baton Rouge, La., assignor to Standard Oil Development Company, a corporation of Delaware Application June 6, 1947, Serial No. 752,972

3 Claims. (Cl. 23—285)

This invention relates to polymerization processes, relates particularly to low temperature polymerization devices, and relates especially to catalyst injection devices and methods.

It has been found possible to produce a very valuable polymer of isobutylene with a multi-olefin, such as isoprene or the like by mixing the two in major and minor proportions, adding an appropriate diluent, cooling the material to a temperature within the range between about $-40$ and $-164°$ C., and polymerizing the cold mixture by the addition into the cold material of a jet or stream of polymerization catalyst; in the form of a Friedel-Crafts active metal halide catalyst in solution in a low freezing, non-complex-forming solvent. However, in this reaction, difficulty is encountered in the addition of the catalyst. It is essential that the rate of catalyst addition be adjusted according to the rate at which the polymerization reaction is occurring, so that if the reaction is proceeding at a rapid rate, the catalyst addition rate can be reduced somewhat to prevent undue rise in temperature; whereas if the polymerization rate is proceeding unduly slowly, the catalyst addition rate can be increased to avoid undue reduction in production rate. At the same time it is highly desirable that the catalyst jet be added at as high a rate or velocity, and under as high pressure as possible in order to obtain the improved dispersion and mixing of the catalyst into the cold olefinic material which comes from the use of a high pressure jet. Also, it is highly desirable that the catalyst supply be shut off immediately in the event of a stoppage of the reactor outlet or overflow, to prevent fouling of the reactor surfaces, and also it is highly desirable that means be provided for preventing plugging of the jet tip during intervals of low catalyst delivery rate.

According to the present invention, a catalyst delivery jet is produced in the form of a relatively long tube having a cap at the end with a central hole, the inner edge of which is beveled to form a valve seat, cooperating with a movable valve member carried upon the control rod which is supported by guides within the catalyst jet tube and is carried through a packing gland at the end of the catalyst injection tube; a side outlet being provided to the tube. The catalyst valve is then controlled by a diaphragm type control means in which the valve is opened by increasing the air pressure on one side of the diaphragm sufficiently to overcome the pressure of a spring on the other side of the diaphragm. The valve is closed by the spring upon reduction of the air pressure on the diaphragm. To eliminate plugging of the reactor and the injection tube when the reactor pressure increased due to the outlet plugging, the instrument is equipped with a relay which when actuated by the pressure rise in the reactor, bleeds the air from the diaphragm and closes the valve. Another relay actuated by a pressure drop on the catalyst supply line closes the valve when the pressure drops.

Thus one or more of the catalyst injection jets with the valve control at the jet tip is provided such that the full available catalyst pressure is present at the delivery jet to insure optimum dispersion of the catalyst at the same time that the rate of catalyst flow is adjusted according to the general condition of operation of the reactor. The catalyst flow meter is set according to the established condition of the reactor, the reactor contents and character of the feed being used, and the established rate is modified to maintain the desired production rate; while the pressure control serves as a stand-by protection to cut off the catalyst flow in the event that the reactor outlet or overflow is plugged, and an auxiliary relay control serves as protection against low catalyst solution pressure.

Thus the device of the invention injects the catalyst stream into the reactor under a maximum pressure to obtain optimum dispersion into the polymerizate, while the rate of flow is adjusted according to a predetermined flow rate with means provided to interrupt the flow completely upon plugging of the overflow or failure of catalyst supply pressure. Other objects and details of the invention will be apparent from the following description when read in connection with the accompanying drawings: wherein Figure 1 is a view in vertical section of the jet of the present invention; Figures 2, 3 and 4 are views in vertical section respectively of the valve seat, packing gland, and valve rod support.

Figure 5 is a view in vertical section of the air power operating means.

Figure 6:
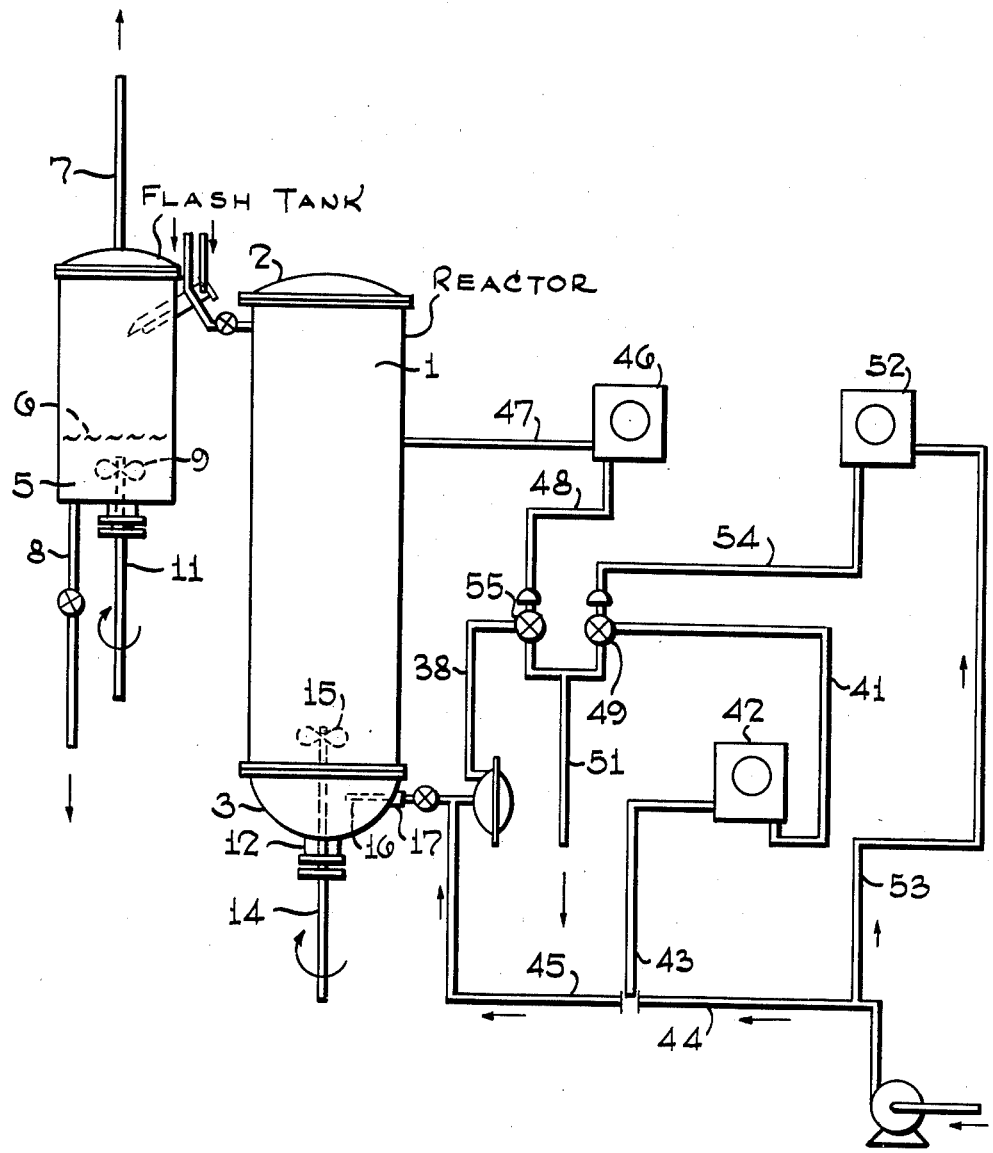
Figure 6 is a diagrammatic view of the reactor catalyst injection jet and control mechanism.

Referring to Figure 6, the reactor member 1, having a top head 2, and a bottom head 3, is equipped with an overflow member 4 discharging into a flash tank 5 in which there is provided a pool of warm water 6. An outlet pipe 7 takes out the flashed gases and a drain member 8 takes the water slurry out. A stirrer 9 mounted on the shaft 11 driven by a motor (not shown) is likewise provided. The bottom head 3 of the reactor 1 is provided with a packing gland 12 through which a shaft 14 passes to a stirring popeller 15. The catalyst delivery jet 16 as shown in further detail in Figure 1 is passed through a packing gland 17 attached to the bottom head 3. Conventional inlet lines not shown for reactant materials to be introduced into the reactor 1 may also be provided as necessary.

As shown in Figure 1 the catalyst delivery jet 16 consists of injection tube 18 which may conveniently take the form of a ¾ inch outside diameter brass tubing having an overall length of approximately 4½ to 5½ feet, and a wall thickness of approximately 0.075 inch. The inner end of the injection tube 18 is closed by a cap member 19 which has a central hole 21 as shown in greater detail in Figure 2, a section view of the complete valve seat. The hole 21 is conveniently beveled at the inner end. Within the injection tube 18 there is provided the valve rod 22 having a valve head or valve plug 23 as shown in Figure 1, cooperating with the hole 21. The valve plug 23 conveniently has an extended tip as shown to increase the velocity of the catalyst stream. The valve rod 22 is supported within the injection tube 18 by a plurality of guide members or valve rod supports 24, as shown in Figure 1 and as shown in greater detail in Figure 4. These guide members may conveniently be welded or braised from the exterior as shown in Figure 4. The outer end of the injection tube 18 conveniently enters a T member 25, having a side inlet 26 as shown in Figure 1, for the admission of catalyst solution. The third opening of the T member is conveniently closed by a packing gland 27 as shown in further detail in Figure 3. Packing gland 27, as shown, has a reduced end threaded to enter the T member 25 and is bored to make a close fit with the valve rod 22. The other end of the packing gland 27 is internally threaded to take the end of a diaphragm actuator as shown in greater detail in Figure 5. The diaphragm actuator consists of a frame 31 having a packing gland 32 with a rod member 33 adapted to be coupled to the end of the valve rod 22. The rod member 33 is fastened to the center of a diaphragm 34, which in turn is carried on frame 31 as shown. A cap member 35 is provided which protects the diaphragm 34 and clamps the diaphragm against the frame 31. A spring member 36 is also provided with an adjusting screw positioned between the cap member 35 and the diaphragm 34 to exert pressure to close the valve plug 23 against its seat in the cap 19. An air pressure connection 38 is provided to the frame 31 for the admission and exhaust of air under pressure for movement of the diaphragm 34 and with it the valve rod 22.

The air pressure connection 38 has connected to it a plurality of supply connection and relief valves as shown in Figure 6. Primarily the main connection is through an air control pipe 41 to a recording flowmeter controller 42 which in turn is actuated through a pipe line 43 by a flowmeter 44 in the catalyst supply line 45. The pressure of air delivered through the air control pipe 41 from the recording flowmeter controller 42 determines the degree of opening of the valve plug 23 and is the primary control on the rate of catalyst admission.

Secondarily, a pressure recorder 46 connected to the reactor through a pipeline 47 controls the admission of air through a pipeline 48 to an auxiliary valve 55 in the air control pipe 41. When the auxiliary valve 55 is actuated by the pressure recorder 46, air is exhausted through the air pressure connection 38 from the diaphragm 34 to atmosphere through the outlet line 51, thereby permitting the spring member 36 to actuate the diaphragm and close the valve plug 23, thereby completely shutting off the catalyst supply to the reactor.

A pressure recorder 52 is provided and coupled through pipeline 53 to the catalyst supply line 45, and this recorder 52 likewise sends air through a pipeline 54 to a second auxilliary valve 49 which imposes an auxilliary control on the air supplied from the recording flowmeter controller 42, bleeding out some of the air from the recording flowmeter controller 42 through the outlet line 51 to atmosphere to reduce the pressure under the diaphragm and thereby close the valve plug 23 when the catalyst supply pressure fails. For the purposes of this invention, the recorder elements 42, 46, and 52, may be any standard and conventional element such as is normally used in pneumatic recorder or control systems. Such elements are normally provided for connection to a suitable source of air supply providing the means for pneumatic operation of connected control elements such as valves 49 and 55 or the valve control device illustrated and described.

In the operation of the present invention, the primary raw material is isobutylene which forms the major component of the reaction mixture. The minor component consists of a multiolefin having more than a single carbon to carbon double linkage and from 4 to 14 inclusive carbon atoms per molecule. The preferred multi-olefin is isoprene. Second choice multi-olefins are butadiene, piperylene, dimethyl butadiene, cyclopentadiene, dimethallyl, and myrcene which are representative of all of the 4 carbon to 14 carbon atom multi-olefins. Other useful multi-olefinic compounds are the doubly unsaturated ethers such as allyl ether, methyl and ethyl butoxy diene ethers, and similar compounds. For the purposes of this application the multi-olefins are defined as any organic compound having more than one carbon to carbon double linkage, without regard to the presence of substitutents of any sort and they are expressly understood under this definition to include halogen substituted organic compounds with two or more carbon to carbon double linkages; and similar oxygen substituents where the oxygen is in the linear chain as in the ethers, and esters or in a side chain as in the higher unsaturated alcohols. That is; the criterion of a "multi-olefin" is the presence of two or more carbon to carbon double linkages without regard to the character or position of substituents.

The polymerization mixture thus consists essentially of a major proportion of an isobutylene and a minor proportion of a multi-olefin as above described. This mixture may be polymerized as such, if desired, and excellent polymers of unique characteristics are obtained. Preferably however, the polymerization is conducted in the presence of a diluent. This diluent may conveniently be an alkyl halide having a melting point at or below the desired polymerization temperature; such substances as ethyl or methyl chloride being particularly useful, or it may consist of a multi-halo substituted aliphatic compound such as chloroform, methylene dichloride, ethylene dichloride, and the like, which are particularly suitable. Also, butyl, mono, di and trichloride are useful in some reactions; carbon tetrachloride also being useful in some reactions. Thus for the purpose of this specification an alkyl halide is defined as any linear chain saturated compound having one or more halogen substituents without regard to the number or position of the halogen in the molecule. Alternatively such substances as carbon disulfide and the lower boiling hydrocarbons may be used as diluents; propane, butane, pentane, hexane, and the like, being particularly useful as diluents.

The polymerization reaction is preferably conducted at a temperature within the range between −40° C. and −164° C. The reduced temperature may conveniently be obtained by the use of a refrigerating jacket upon the reactor and if desired, upon storage and mixing containers. For this purpose the preferred refrigerant is liquid ethylene yielding a jacket temperature between −95° C. and −103° C., or lower, depending upon the purity of the refrigerant and the back pressure or reduction from the compressor. Alternatively, such refrigerants as carbon dioxide, either liquid or solid, or liquid ethane, or liquid sulfur dioxide or various of the low boiling liquid organic fluorides or fluorochlorides, sold on the market collectively under the name of "Freon." For the refrigerant it is required only that it have a suitable boiling point under convenient suction pressure and that it be reasonably priced.

Alternatively an internal refrigerant may be used, mixed directly with the olefinic material. For this purpose such substances as liquid ethylene, liquid ethane, liquid or solid carbon dioxide, various of the "Freons" and even on occasion liquid propane may be used. In this instance, the internal refrigerant must show a satisfactory mixed boiling point and must be inert with respect both to the olefinic material and the catalyst; these requirements ruling out liquid ammonia and usually liquid sulfur dioxide.

The polymerization is conducted by the application of a Friedel-Crafts active metal halide catalyst, preferably in solution in a low freezing, non-complex-forming solvent. The preferred catalyst substance is aluminum chloride but any of the Friedel-Crafts catalysts disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, are usable.

For the solvent, the preferred solvents are ethyl or methyl chloride or chloroform or methylene dichloride or carbon disulfide, or with boron trifluoride or aluminum bromide, various of the lower boiling saturated hydrocarbon solvents may be used. That is to be low freezing, it is only necessary that the solvent have a freezing point below 0° C. To be non-complex-forming it is only necessary that there shall not separate from the solution, upon evaporation of the solvent, a compound between the solvent and the Friedel-Crafts catalyst; or alternatively, that the addition of the solvent in the form of a vapor to the catalyst at substantially constant temperature shall lead to a substantially continuous change in the composition of the catalyst phase and to a continuous increase in the partial pressure of the solvent, in general, the catalyst being recoverable unchanged by the removal of the solvent.

The reaction is then preferably conducted by injecting a stream of the catalyst solution into the cold, rapidly stirred olefin-containing material in the reaction vessel.

In the operation of the present embodiment, the reactor 1 is cooled by the delivery of a supply of liquid ethylene to the refrigerating jacket and the delivery of a supply of an olefin-containing material to the reaction space in the reactor vessel. Suitable reactors are well shown in the copending applications of John H. Bannon, S. N. 448,575, filed June 26, 1942, now abandoned, and Joseph Nelson, S. N. 545,099, filed July 15, 1944, now Patent 2,577,856 to which cross reference is herewith made; and the subject matter of which is herewith incorporated into the present application.

When the olefinic material has been cooled to the desired polymerization temperature; usually −95° C. (or somewhat below), the catalyst solution is delivered, usually from a blow case under pressure, or by a centrifugal pump, to the spray head. The catalyst solution is delivered to the opening 26 in the T member shown in Figure 1, with the tube 18 inserted through the packing gland in the bottom head 3 of the reactor 1; or it may be inserted in the top if desired. When sufficient pressure has been built up to deliver a satisfactory stream of catalyst into the reaction mixture and conditions are otherwise suitable, a supply of air is delivered to the controller 42 which passes on the air under pressure to the connection 38 and the diaphragm 34, the pressure serving to open the valve 23 and permit the discharge of the catalyst solution into the cold reaction mixture. As soon as the catalyst begins to flow, the flow meter 44 takes control of the member 42 and adjusts the air pressure to hold the rate of flow at the desired value. The polymerization reaction then begins and continues steadily while a supply of fresh olefinic feed is delivered to the reactor and a slurry of polymer in diluent overflows through member 4 into the flash tank 5 where the volatiles are evaporated and discharged through the outlet line 7 and a slurry of polymer in water is discharged through the drain line 8. If for any reason the polymerization rate becomes unduly high, as may happen when unexpectedly high purity reactants are delivered and a very high reaction rate is encountered, followed by a reactor "runaway" and the concomitant production of large masses of polymer and the usually unavoidable plugging of the overflow 4 by such masses, the increase in pressure in the reactor produced by the pressure of the feed stream actuates the control member 46 which releases the exhaust valve 55, discharges all pressure from the face of the diaphragm 34, and permits the spring 36 to close the valve 23, thereby shutting off the flow of catalyst entirely, until the plug in the overflow has been discharged.

Thus the processes and apparatus of the present invention delivers the catalyst solution into a reaction material at the maximum obtainable speed and turbulence by the effect of a jet nozzle and needle valve combination inside the reactor so that the full pressure drop is encountered immediately at the nozzle to produce maximum jet speed, while the nozzle needle valve is automatically controlled by, first the flow meter, secondly, in case of a catalyst pump failure, by a pressure control auxiliary control which closes the valve completely, and thirdly, shut down entirely in an emergency by a pressure sensitive controller when the reactor pressure rises; the combination of these various members yielding maximum dispersion of the catalyst solution into the polymerizate at all times, while controlling the rate of flow according to a predetermined amount.

While there are disclosed above but a limited number of embodiments of the device and process of the invention it is possible to produce still other embodiments without departing from the inventive concept herein disclosed and it is therefore desired that only such limitations be imposed upon the appended claims as are stated therein or required by the prior art.

The invention claimed is:

1. An improved reactor apparatus which comprises in combination a jacketed reaction vessel, a plurality of inlet and outlet conduits attached thereto, a diaphragm actuated regulator valve positioned at the inlet end of one conduit; the valve comprising an elongated tube extending into said reaction vessel, a terminal nozzle of said elongated tube located centrally within said reaction vessel, a chamber communicating with the other terminal end of said tube, a flexible diaphragm mounted in said chamber and dividing it into a first and a second compartment; a side port on the valve tube communicating with the inlet conduit, a centrally positioned slidable shaft extending through the tube and defining the valve stem, one end of the shaft being adapted for sealing engagement with the interior of the nozzle and the other end of the shaft being attached to the diaphragm of the regulator valve within the first compartment of the chamber, a gas tight packing gland positioned within said tube between the side port and the chamber through which the shaft passes; an adjustable spring positioned in the second compartment of the chamber with one end of said spring in contact with the diaphragm at a point opposite the end of the shaft; a flow meter controller, a gas control manifold connecting the first compartment of the chamber to said flow meter controller, a flow meter positioned in the inlet conduit at a point upstream from the regulator valve, a source of gas under pressure which, with said flow meter, actuates the flow meter controller, whereby the flow through the terminal valve nozzle is maintained at a desired rate, a pressure responsive exhaust valve positioned in said gas control manifold and connected to the reaction vessel, whereby gas is discharged from the first chamber compartment when the pressure in the reaction vessel becomes excessive, and causing the spring to close the valve independently of the action of the flow meter controller.

2. An apparatus according to that described in claim 1 wherein the gas control manifold also comprises a second pressure-responsive exhaust valve, a pressure recorder connected thereto and communicating with the inlet conduit at an upstream point, a pump proximate thereto, and a source of gas under pressure, whereby said exhaust valve is adapted to discharge air from the first compartment when the positive pressure in the inlet conduit fails.

3. An improved reactor vessel which comprises in combination a jacketed reaction vessel, a plurality of inlet and outlet conduits attached thereto, a diaphragm-actuated regulator valve positioned at the inlet end of one conduit; the valve comprising a chamber, a diaphragm positioned therein, an elongated inlet conduit tube extending into said reaction vessel, a terminal nozzle of said tube positioned within said reaction vessel, a side port on said valve tube communicating with the inlet conduit, a slidable shaft extending through said tube and centrally positioned therein; and defining a valve stem, one end of said shaft adapted for sealing engagement with the interior of said terminal nozzle and the other end of the shaft attached to the diaphragm of the pressure regulator, and a gas tight packing gland positioned within said tube positioned between the side port and the diaphragm, a flow meter controller, and a separate line connecting said pressure regulator valve through said flow meter controller to said inlet conduit, the flow meter controller comprising a source of gas under pressure whereby the diaphragm of the pressure regulator valve is actuated by the rate of flow through the inlet conduit.

GEORGE M. EFFERSON.

References Cited in the file of this patent

UNITED STATES PATENTS

| Number | Name | Date |
|---|---|---|
| 1,320,323 | Drucker | Oct. 28, 1919 |
| 2,395,079 | Sparks | Feb. 19, 1946 |
| 2,416,760 | Lawler et al. | Mar. 4, 1947 |
| 2,478,707 | Purvin | Aug. 9, 1949 |